United States Patent [19]

Sherman

[11] 4,442,921

[45] Apr. 17, 1984

[54] LIFT PLATFORM AUTOMATIC RAMP BARRIER

[75] Inventor: William D. Sherman, Upper Sandusky, Ohio

[73] Assignee: REB Manufacturing, Inc., Carey, Ohio

[21] Appl. No.: 236,838

[22] Filed: Feb. 23, 1981

[51] Int. Cl.[3] .......... B60S 13/00

[52] U.S. Cl. .......... 187/8.52; 414/545; 254/89 R

[58] Field of Search .......... 187/8.52, 8.41, 8.65, 187/9 R; 414/921, 539, 540, 545, 546, 556; 254/89 R, 2 C, 45, DIG. 9

[56] References Cited

U.S. PATENT DOCUMENTS

| | | | |
|---|---|---|---|
| 1,936,107 | 11/1933 | Cunneen | 254/1 |
| 1,938,446 | 12/1933 | Bacher | 187/8.52 |
| 1,943,003 | 1/1934 | Cochin | 187/70 |
| 1,946,320 | 2/1934 | Hollister | 187/8.52 |
| 1,952,906 | 3/1934 | Bristol | 187/8.52 |
| 1,955,586 | 4/1934 | Hott et al. | 187/8.52 |
| 1,966,975 | 7/1934 | Clapp | 187/8.52 |
| 2,052,118 | 8/1936 | Tear | 187/8.52 |
| 2,098,376 | 11/1937 | Cunneen | 187/8.52 |
| 2,569,982 | 10/1951 | Estel, Jr. | 187/8.52 |
| 3,252,544 | 5/1966 | Lill | 187/8.52 |
| 3,458,013 | 7/1969 | Haynes | 187/8.52 |
| 3,913,759 | 10/1975 | Deacon | 414/546 |
| 4,095,704 | 6/1978 | Ratliff | 414/556 |
| 4,124,130 | 11/1978 | Rohrs et al. | 187/8.52 |
| 4,140,230 | 2/1979 | Pearson | 414/546 |

*Primary Examiner*—Joseph J. Rolla
*Assistant Examiner*—Kenneth Noland
*Attorney, Agent, or Firm*—Hugh Adam Kirk

[57] ABSTRACT

A platform lift with a ramp corresponding to the platform's thickness along one edge thereof, at least a part of which ramp is hinged along said edge and normally urged and locked in an upward barrier position to prevent objects from sliding or rolling off the platform when the platform is away from the ground. A single lever attached to the hinged ramp part depends below the platform and automatically releases the latch for maintaining the ramp as a barrier and then engages and moves the ramp part into its ramp-employing position as the lever contacts the ground. This lift platform and ramp part barrier mechanism is particularly adapted for wheelchair lifts on vehicles.

26 Claims, 6 Drawing Figures

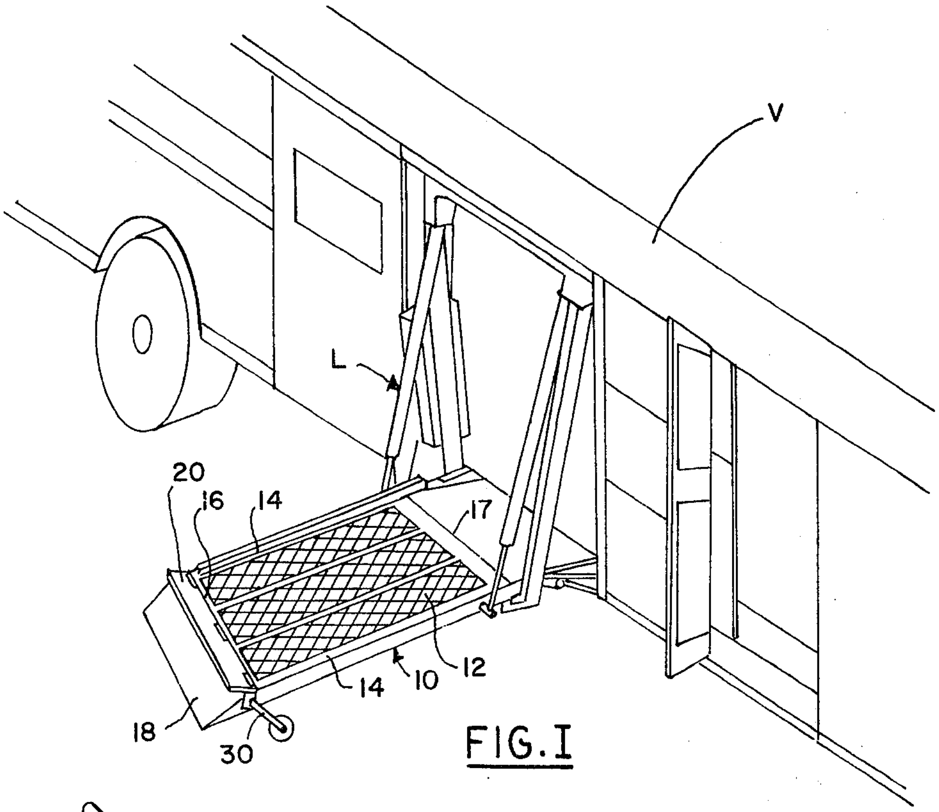
FIG. I
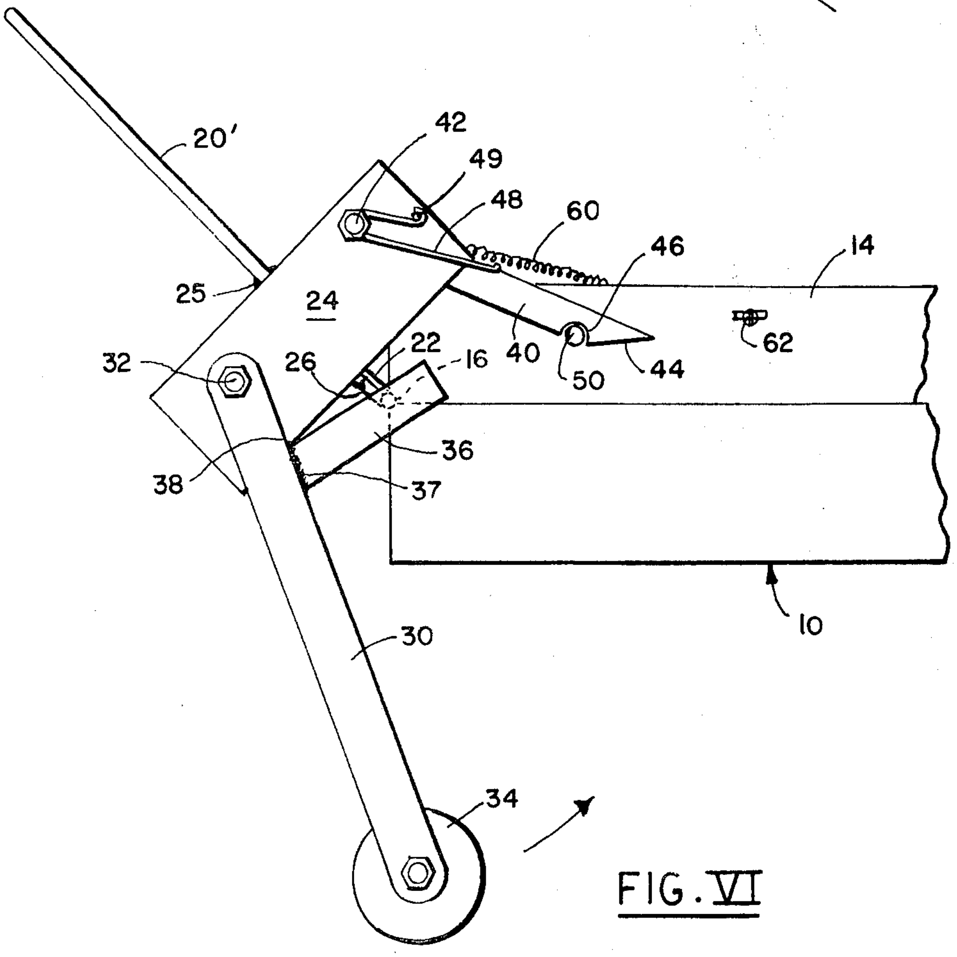
FIG. VI

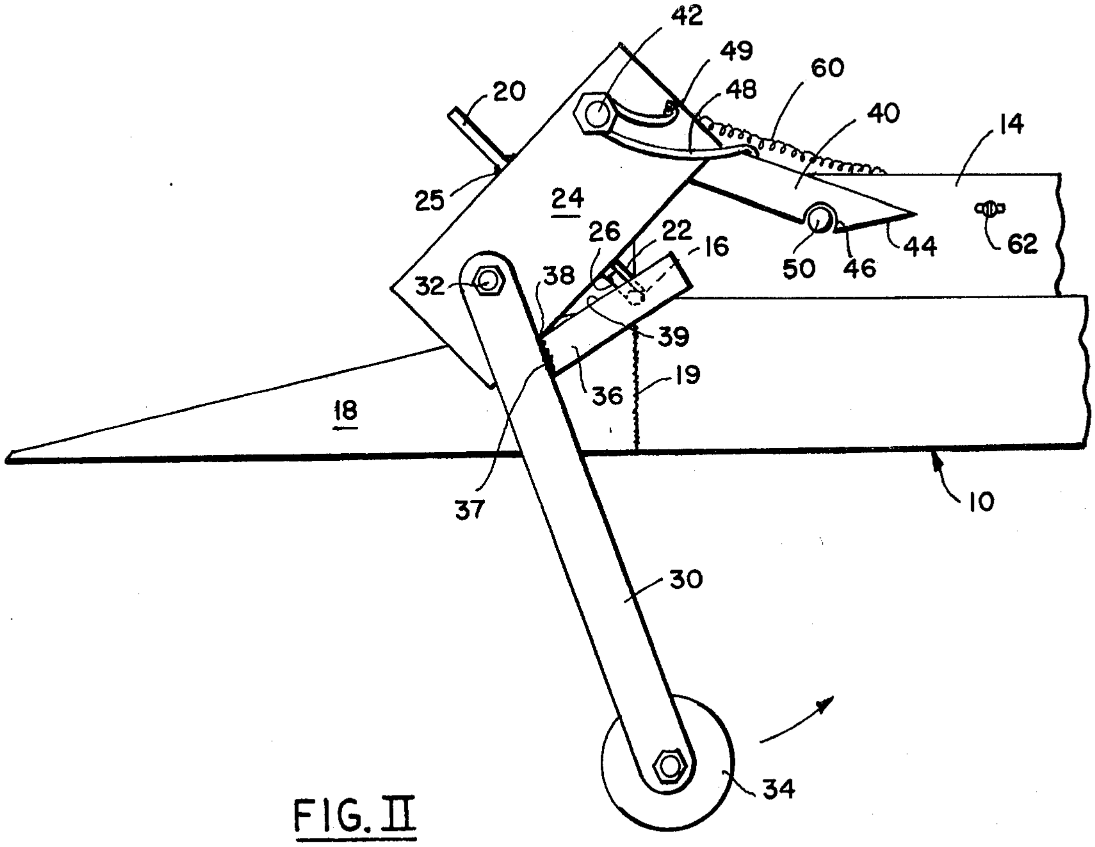
FIG. II
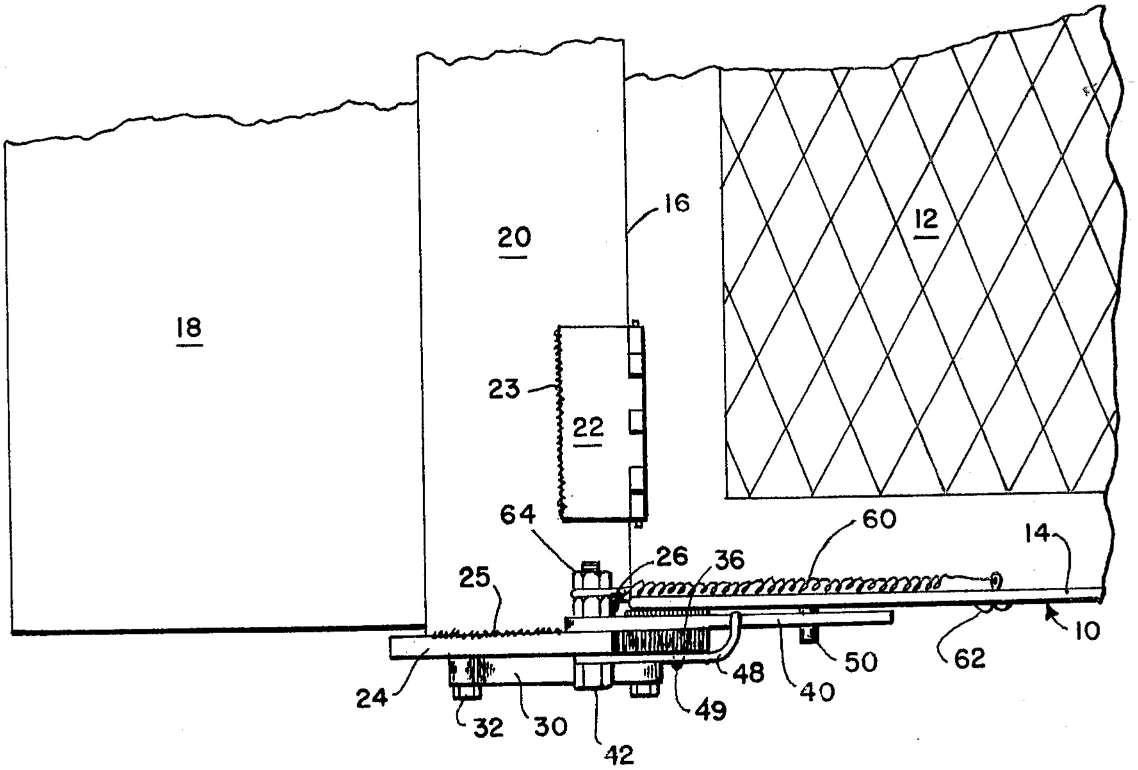
FIG. III

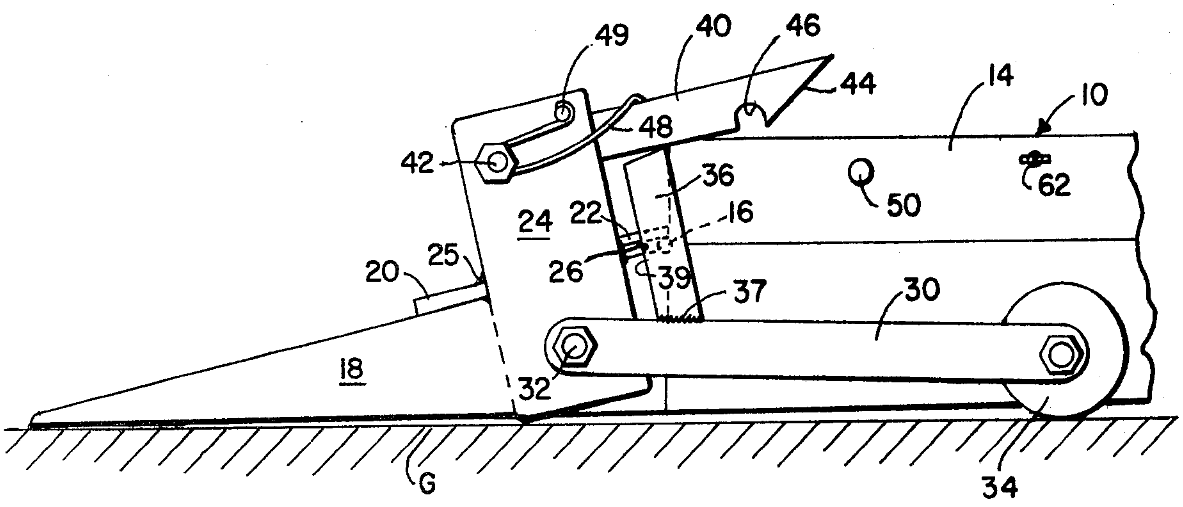
FIG. IV
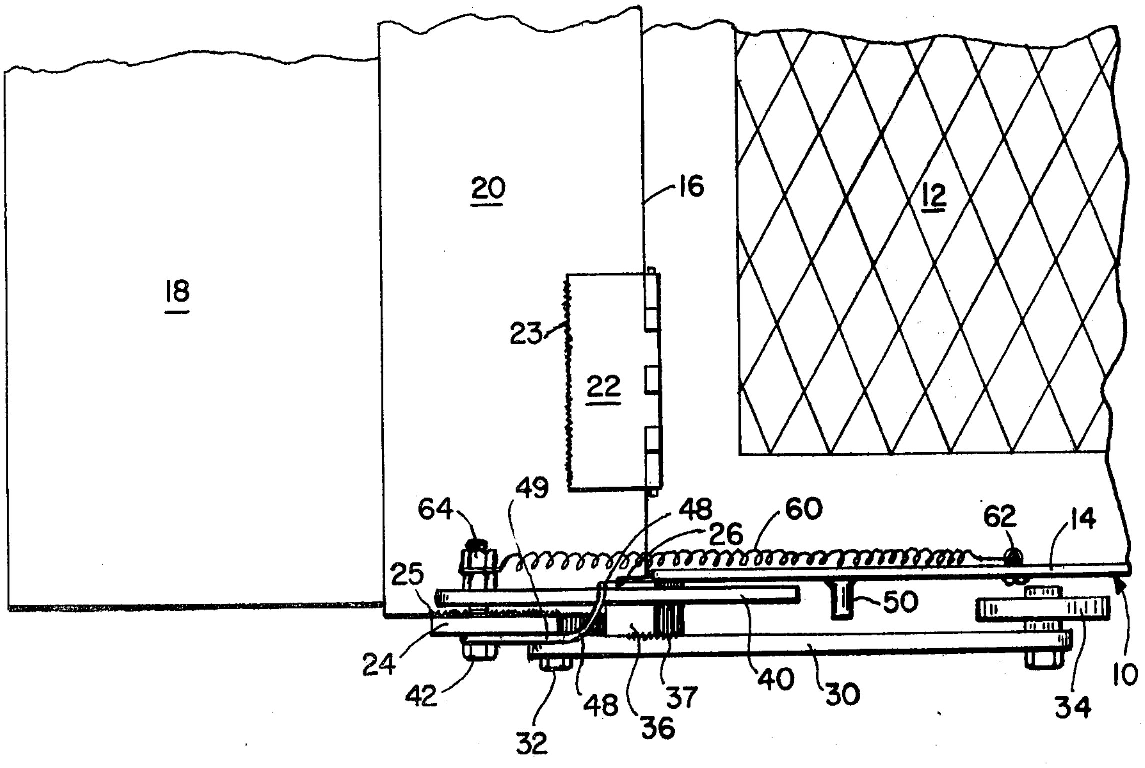
FIG. V

LIFT PLATFORM AUTOMATIC RAMP BARRIER

BACKGROUND OF THE INVENTION

Hinged ramps for platform lifts, which ramps act as barriers or stops to prevent objects from sliding or rolling off the lifts are well known as disclosed in the following three patents:

| | | | |
|---|---|---|---|
| Rohrs et al | 4,124,130 | Nov. 7, 1978 | Cl. 214/75R |
| Deacon | 3,913,759 | Oct. 21, 1975 | Cl. 214/77R |
| Pearson | 4,140,230 | Feb. 20, 1979 | Cl. 214/77R |

There also exists many hinged ramps on platforms with separately hinged barriers or stop plates, particularly those employed on garage vehicle lifts at the end of the channel tracks for the wheels of the vehicle, as disclosed in the following patents:

| | | | |
|---|---|---|---|
| Hollister | 1,946,320 | Feb. 6, 1934 | Cl. 254/89 |
| Cunneen | 2,098,376 | Nov. 9, 1937 | Cl. 254/89 |
| Ratliff | 4,095,704 | June 20, 1978 | Cl. 214/77P |
| Bristol | 1,952,906 | Mar. 27, 1934 | Cl. 254/89 |
| Hott er al | 1,955,586 | Apr. 17, 1934 | Cl. 254/89 |
| Estel, Jr. | 2,569,982 | Oct. 2, 1951 | Cl. 254/89 |
| Lill | 3,252,544 | May 24, 1966 | Cl. 187/8.52 |
| Bacher | 1,938,446 | Dec. 5, 1933 | Cl. 254/89 |
| Clapp | 1,966,975 | July 17, 1934 | Cl. 254/89 |
| Cunneen | 1,936,107 | Nov. 21, 1933 | Cl. 254/89 |
| Cochin | 1,943,003 | Jan. 9, 1934 | Cl. 254/89 |
| Tear | 2,052,118 | Aug. 25, 1936 | Cl. 254/89 |

These above patents also disclose ground-engaging levers, links, end latches, most of which are quite complicated and contain many moving parts which easily wear, become clogged with dirt, and become jammed and inoperative.

SUMMARY OF THE INVENTION

The safety barrier of this invention for platform lifts comprises a hinged plate extending along the top edge of a horizontal platform, which plate may be pivoted from a ramp position into an upward barrier or stop position automatically when the platform leaves the ground. This is controlled by a single lever and latch mechanism pivotally attached to a bracket at one end of the hinged barrier plate. This hinged plate may also comprise the whole ramp means between the top edge of the platform and the surface of the ground upon which the platform rests or a ramp corresponding to the thickness of the platform, so that objects, particularly wheeled objects and wheelchairs, will have easy access to and egress from the platform. If the barrier plate does not act as the whole ramp, it is usually a part thereof and in its non-barrier position, usually lies flush with the permanent ramp provided on the edge of the platform. In either case, at least one end of the hinged barrier plate or ramp part means has fixedly attached thereto, such as by welding, a transverse bracket or end plate to which are pivoted: (a) a spring-urged hook-type pawl latch above the plate for engagement with a locking pin on the side edge of the platform to maintain the ramp barrier plate in its barrier position; and (b) a single ground-engaging lever, the lower depending or ground-engaging end of which may be provided with a wheel or roller. This single lever also contains an outward projection or bar for engagement with and releasing the hook latch, and for engaging and moving the barrier into its ramp position when this lever is moved by engagement with the ground. The pivoted movement of this single lever may be limited by a separate stop means or by abutment of its unlatching projection with its mounting bracket or ramp barrier end plate. Resilient means such as springs normally urge the ramp barrier plate into its barrier position and the hook latch into engagement with its locking pin. Thus the action of the lever when it contacts the ground when approaching the ground, will be against the action of these springs to unlock the hook latch and move the ramp barrier plate from its normal barrier position into its ramp position.

OBJECTS AND ADVANTAGES

It is an object of this invention to produce a simple, efficient, effective, economic and safe automatic barrier to prevent objects from rolling or sliding off horizontal lift platforms when the platforms are away from the ground.

Another object is to produce such a barrier which also may act as a ramp between the top surface of the platform and the ground when the platform is resting on the ground.

BRIEF DESCRIPTION OF THE VIEWS

The above mentioned and other features, objects and advantages and a manner of attaining them are described more specifically below by reference to embodiments of this invention shown in the accompanying drawings, wherein:

FIG. I is a perspective view of a wheelchair lift attached to the side of a bus incorporating on the outer end of its lift platform a barrier or stop means according to a preferred embodiment of this invention showing this stop means in its barrier-stopping position when the platform is away from the ground;

FIG. II is an enlarged side elevational view with parts of the platform broken away, showing the barrier stop means and its automatic operating mechanism shown in FIG. I;

FIG. III is a plan view of the broken-away part of the platform showing the barrier stop means and its operating mechanism shown in FIG. II;

FIG. IV is a view similar to FIG. II but with the platform on the ground and showing the barrier stop means in its ramp or non-barrier position and with its latch unlatched;

FIG. V is a plan view like FIG. III showing the barrier stop means in the position shown in FIG. IV; and FIG. VI is a view similar to FIG. II showing another embodiment of this invention in which the whole ramp end of the lift platform is hinged to comprise the movable barrier stop means.

DETAILED DESCRIPTION OF THE PREFERRED EMBODIMENTS

In FIG. I there is shown in perspective a portion of the vehicle V, such as a school bus, in which is mounted a wheelchair lift L such as of the type disclosed in applicant's assignee's U.S. Pat. No. 4,056,203 issued Nov. 1, 1977 for "Platform Lift". This lift L has a platform 10 which may comprise a grating 12, parallel upwardly extending side edges 14 and open front and rear edges 16 and 17, respectively. The top horizontal surface of the platform 10 is spaced above the ground corresponding to the thickness of the platform, which space is bridged by a ramp, which may be a fixed section 18 attached such as by welding 19, to the front end of the platform 10.

Hinged along the front edge 16 of the platform 10 is a stop or barrier plate 20 which preferably extends along the full length of the edge 16 and is hinged thereto, such as by a piano-type hinge or by a plurality of leaf hinges 22 (see FIGS. III and V), one of the leaves 22 of which is herein shown to be attached by welding 23 to the barrier plate 20. This barrier plate 20 normally is in the position shown in FIGS. I to III when the platform 10 is away from the ground and is movable into a ramp position as shown in FIGS. IV and V when the platform is in contact with the ground G as shown in FIG. IV.

Since the barrier plate 20 also acts as a ramp, it may completely replace the rigid or integral ramp 18, as shown in the embodiment in FIG. VI and comprise a ramp stop or barrier plate 20' without departing from the scope of this invention. This ramp stop barrier plate 20' is operated and controlled in the same manner and by the same means or mechanism as that of the barrier stop plate 20 described in more detail below.

At at least one end of the barrier plate 20 or ramp barrier plate 20' there may be attached a bracket or end plate 24 such as by welding 25, which end plate may extend perpendicular to the plane of the barrier plate 20 or ramp 20' on both sides of the plane of the barrier plate 20. To this end of the barrier plate 20 or 20' or to this bracket 24 are directly pivotally attached a single ground-engaging lever 30 and a spring-actuated cam, pawl, or hook latch 40.

The pivoted ground-engaging lever 30 may be pivoted such as by a bolt 32 to the bracket 24 and may have on its outer opposite depending end a ground-engaging roller 34 to reduce any friction or gouging into the ground G when the platform 10 approaches the position shown in FIG. IV. Mounted on one side of this lever 30 may be a rigid outwardly and/or upwardly projecting bar or latch-hook-disengaging projection 36 such as by welding 37. This projecting bar 36 may integrally form with the single lever arm 30 a Y-shaped lever member. This bar 36 also may act as a stop for limiting the downward movement of the lever 30 by engaging the side of the bracket 24 at the point 38 as shown in FIGS. II and VI. This lever member 30 normally is held against the stop point 38 by the gravitational pull of the weight of the lever member and its roller 34, when the platform 10 is away from the ground G as shown in FIGS. I through III and VI. The other position of this pivoted lever member 30 and 36 is to engage the barrier plate 20 or 20' and move it into its non-barrier or ramp position as shown in FIGS. IV and V, such as by the side 39 of the bar 36 engaging the notch 26 in the end of the barrier plate 20 and 20', after the roller 34 engages the ground G and the projection 36 has unhooked the latch 40 from the pin 50.

Also pivoted to and preferably above the barrier or ramp plate 20 or 20' such as on the bracket 24, is the hook latch 40 such as by means of a bolt 42, the outer free end of which latch lever 40 may have a cam surface 44 terminating inwardly from the end in a notch or detent 46 which hooks onto or engages a pin 50 securely or rigidly mounted on the platform 10 such as to its side rail 14. This pawl lever or latch hook 40 is urged into its pin latching position as shown in FIGS. II and VI such as by means of a spring 48 which may be wrapped around the pivot 42, anchored at one end to the plate or bracket 24, such as by a pin 49 and have its other end hooked over the upper edge of the pawl latch lever 40. This latch 40 is released by the projecting bar 36 on the lever 30 when the lever 30 contacts the ground G as the platform 10 approaches the position shown in FIGS. IV and V. Thus the top or outer end of the bar 36 engages the bottom edge of the pawl 40 and lifts it off of or unhooks it from the pin 50. Then further movement of the lever member 30 and its bar 36 may cause the bar 36 to engage a notch 26 in the end of the barrier plate 20 or 20' at point 39 on the bar 36 to move the barrier plate 20 or 20' into its non-barrier or ramp position as shown in FIGS. IV and V.

During the time this platform moves from the position shown in FIG. II to that of FIG. IV, the projecting bar 36 is not always in contact with the lower edge of the pawl 40 and when it isn't, the cam edge 44 on the outer end of the pawl latch 40 rides over the top of the stationary pin 50 so that further movement will cause the lever 40 to slide along this cam surface 44 and fall into the notch 46, as soon as the roller 34 on the lever member 30 is completely free of the ground G as shown in FIGS. I, II and VI.

The barrier 20 or ramp barrier 20' is urged in the barrier stop position shown in FIGS. I, II, III and VI by means of a spring 60 which may be anchored between the bolt 42 for the pivot of the latch 40 and a fixed location, such as to a split pin 62 extending through an aperture in the rail 14. Thus, the spring 60 urges the plate barrier 20 or ramp 20' into its upward barrier or stop position at an angle above the plane of the surface of the platform 10 during all the time that the platform 10 is away from the ground G, and this urged barrier position is maintained by means of the hook latch 40.

If desired, the same control mechanism as shown in FIGS. II through VI may also be provided at the other end of the ramp plate 20 or 20', or at both ends thereof, without departing from the scope of this invention.

It is to be clearly understood that the shape and extension of the bracket 24 may be changed and the locations of the pivots 32 and 42 thereon and the shapes and lengths of the lever member 30 and latching pawl 41 may be changed to fit other platforms without departing from the scope of this invention, provided the same functions that are described above are performed by these parts. Such as for example, the hinges 22 may be a piano-type hinge and maybe have their leaves welded to the other side of the ramp barrier plate or to the under side or top side of the ramp 18, or to the top side of the platform 12, as desired. Also the wheel 34 at the end of the lever 30 may be replaced by a shoe which may be permanently anchored or pivoted thereon. The ends of the springs 48 and 60 may be attached in other manners than those shown, and the spring 60 instead of being attached to the pivot bolt 42 by means of an additional nut 64 as shown in FIGS. III and V, it may be attached at a different location onto the bracket 24 or to the hinged barrier plate 20 or ramp 20' without departing from the scope of this invention.

While there is described above the principles of this invention in connection with specific apparatus, it is to be clearly understood that this description is made only by way of example and not as a limitation to the scope of this invention.

I claim:

1. A safety barrier for a platform lift comprising:

(A) a vertical movable platform having an exposed edge, (B) a barrier means hinged along said edge of said platform, (C) means for urging and maintaining said barrier means into its barrier position, said maintaining means comprising a latch means between said barrier means and said platform, and (D) a single lever member directly pivotally attached, for limited movement, at one of its ends to said barrier means and having a ground-engaging means on its other end for moving said barrier means into its non-barrier position, said lever member including means for abutting said latch means for releasing said latch means when said other end of said lever member engages the ground.

2. A barrier according to claim 1 wherein said barrier means comprises a plate hinged along said edge.

3. A barrier according to claim 2 wherein said plate forms a ramp.

4. A barrier according to claim 1 wherein said urging means comprises a helical tension spring.

5. A barrier according to claim 1 wherein said means on said other end of said lever member comprises a roller.

6. A barrier according to claim 1 wherein said latch means includes a resilient means for urging said latch means into its latching position.

7. A barrier according to claim 1 wherein said abutting means also acts to limit the pivotal movement of said lever member.

8. A barrier according to claim 1 wherein said latch means is pivoted to said barrier means.

9. A barrier according to claim 1 wherein said lever member includes means for engaging said barrier means for moving said barrier means into its non-barrier position.

10. A safety barrier for a platform lift comprising:

(A) a vertically movable platform having an edge, (B) a barrier means hinged along said edge of said platform, (C) means for urging said barrier means into its barrier position, (D) means for latching said barrier means into its barrier position, and (E) a single lever means directly pivotally attached, for limited movement, at one of its ends to said barrier means and having ground-engaging means on its other end for unlatching and removing said barrier into its non-barrier position, said lever means including means for abutting said latching means for releasing said latching means when said lever means engages the ground.

11. A barrier according to claim 10 wherein said barrier means comprises a plate.

12. A barrier according to claim 11 wherein said plate forms a ramp.

13. A barrier according to claim 10 wherein said urging means comprises a helical spring.

14. A barrier according to claim 10 wherein said lever means includes a roller on its said other ground-engaging end.

15. A barrier according to claim 10 wherein said latching means comprises a pivoted hook and pin means between said barrier means and said platform for maintaining said barrier means in its barrier position.

16. A barrier according to claim 10 wherein said latching means includes a resilient means for urging said latching means into its latching position.

17. A barrier according to claim 10 wherein said abutting means also acts to limit the pivotal movement of said lever means.

18. A barrier according to claim 10 wherein said latching means is pivoted to said barrier means.

19. A barrier according to claim 10 wherein said lever means includes means for engaging said barrier means for moving said barrier means into its non-barrier position.

20. A lift means for raising a platform from the ground comprising:

(A) a platform having an entrance side and a top surface, (B) a ramp means attached along said side of said platform and extending from the ground to said top surface when said platform engages the ground, (C) stop means comprising at least a part of said ramp means for forming a barrier above said top surface of said platform when said platform is raised from said ground, (D) a lever arm directly pivotally attached, for limited movement, at one of its ends to said stop means and having its other free end for engagement with the ground for moving the stop means out of its barrier position, (E) resilient means for normally urging said stop means into its barrier position, and (F) means for maintaining said stop means in its barrier position when said platform is raised from said ground, said maintaining means comprising a latch means pivotally attached at one end to said stop means and hooked at the other end to said platform, and extending between said stop means and said platform for locking said stop means in its barrier position, said lever arm including an abutting means for engagement with said latch means to unlatch said latch means when said lever arm engages the ground.

21. A lift means according to claim 20 wherein said ramp means is hinged to said side of said platform, and said stop means comprises said ramp means.

22. A lift means according to claim 20 wherein said stop means comprises a plate hinged to said platform engageable with said ramp means.

23. A lift means according to claim 20 wherein said maintaining means comprises a latch means pivotally attached at one end to said stop means and hooked at the other end to said platform, and extending between said stop means and said platform for locking said stop means in its barrier position.

24. A lift means according to claim 20 wherein said latch means includes a resilient means for urging said latch means into its latching position.

25. A lift means according to claim 20 wherein said abutting means also acts to limit the pivotal movement of said lever.

26. A lift means according to claim 20 wherein said lever arm includes means for engaging said stop means for moving said stop means out of its barrier position.

* * * * *